US005652591A

United States Patent [19]
Liu et al.

[11] Patent Number: 5,652,591
[45] Date of Patent: Jul. 29, 1997

[54] WIDEBAND AND WIDE ANGLE SIDELOBE CANCELLATION TECHNIQUE

[76] Inventors: Sien-chang Charles Liu, 1319 N. Beechwood Dr., Brea, Calif. 92621; Donald J. Gibson, 1912 Julie; Nam S. Wong, 1406 Grissom Park Dr., both of Fullerton, Calif. 92633; Raymond Tang, 567 Elinor Dr.; James S. Ajioka, 2330 Terraza Pl., both of Fullerton, Calif. 92635

[21] Appl. No.: 439,730

[22] Filed: Nov. 20, 1989

[51] Int. Cl.$^6$ .................... G01S 3/16; G01S 3/28
[52] U.S. Cl. .................... 342/380
[58] Field of Search .................... 342/380, 383

[56] References Cited

U.S. PATENT DOCUMENTS

| | | |
|---|---|---|
| 3,500,414 | 3/1970 | Woerrlein . |
| 3,803,624 | 4/1974 | Kinsey . |
| 4,222,051 | 9/1980 | Kretschmer, Jr. .................... 343/100 LE |
| 4,313,116 | 1/1982 | Powell et al. .................... 343/100 LE |
| 4,390,881 | 6/1983 | Lewis et al. .................... 343/100 LE |
| 4,408,205 | 10/1983 | Hockham .................... 343/16 R |
| 4,638,320 | 1/1987 | Eggert et al. .................... 342/442 |
| 4,697,188 | 9/1987 | Lin .................... 342/383 |

OTHER PUBLICATIONS

"Direct Search: Solution of Numerical and Statistical Problems," Robert Hooke and T.A. Jeeves, JACM, 8, Apr., 1961.

"Adaptive Array Bandwidth with Tapped Delay–Line Processing," W.E. Rodgers, R.T. Compton, Jr., IEEE Transaction on Aerospace and Electronics Systems, vol. AES–15, No. 1 Jan. 1979.

"A New Class of Adaptive Array Processors," J.H. Chang, F.B. Tuteur, Journal of the Acoustical Society of America, pp. 639–649, Aug. 10, 1970.

Primary Examiner—Thoeodore M. Blum
Attorney, Agent, or Firm—Wanda Denson-Low; Michael W. Sales; Georgann S. Grunebach

[57] ABSTRACT

A wideband, wide angle sidelobe cancellation array system is disclosed. The system includes a main array formed of a plurality of regularly spaced elements, and an auxiliary array formed of two auxiliary antenna elements spaced from the outermost elements of the main array a distance equal to one-half the spacing of the main array elements. The received signals from the main array elements are combined to form a main array signal. The contributions from the auxiliary array elements are combined to form an auxiliary array signal. The two array signals have a good amplitude and phase match over a wide frequency and angle range. The main array and auxiliary array signals are then combined to form a system array signal wherein the sidelobe energy in the main array signal has been substantially cancelled. The system can be made an adaptive one by the addition of adaptive RF phase and amplitude weighting to the auxiliary array signal prior to combining with the main array signal.

8 Claims, 3 Drawing Sheets

WIDEBAND AND WIDE ANGLE SIDELOBE CANCELLATION TECHNIQUE

BACKGROUND OF THE INVENTION

The present invention relates to sidelobe jammer cancellation systems, and more particularly to such a system for radar and communication systems which require wideband signals.

Conventional adaptive sidelobe cancellers are narrow band and narrow angle because the mismatch of amplitude and phase between the auxiliary antenna and the main antenna restricts the cancellation bandwidth and angle.

Multiple auxiliary antennas have been previously proposed to handle a wideband jammer, but were relatively costly and complex. Robert A. Shore and Ronald L. Fante, "Sector Sidelobe Nulling," RADC-TR-81-326, Rome Air Development Center report, November 1981.

Cancellation systems using multiple tapped delay lines and adaptive weights have also been proposed for wideband nulling. J. H. Chang and F. B. Tuteur, "A New Class of Adaptive Array Processors," J. Acoust. Soc. Am., Vol. 49, No. 3, March 1971, pages 639–649; W. E. Rodgers and R. T. Compton, Jr., "Adaptive Array Bandwidth with Tapped Delay-line Processing," IEEE Trans. Aerospace Electronic Systems, Vol. 1, AES-15, No. 1, January 1979, pages 21–28. The costs of multiple weights and time delay lines, and the control of all weights make such systems impractical for wideband radar and communication systems.

It is therefore an object of this invention to provide a wideband, wide angle jammer cancellation system for such applications as imaging radars and frequency hopping or pseudo random noise coded communication systems, and which does not require multiple auxiliary antennas or multiple tapped delay lines and weights for wideband cancellation.

A further object of the invention is to provide a jammer cancellation system employing an auxiliary array, wherein good phase and amplitude matching is achieved between the main array and the auxiliary array, and wherein the auxiliary array has a null at the main beam direction so that gain degradation of the desired signal does not occur.

SUMMARY OF THE INVENTION

These and other objects and advantages are achieved by an array system employing a wideband wide angle side-lobe canceller in accordance with the present invention. The system includes a main array comprising a plurality of main antenna elements regularly spaced and separated by a distance d, and a means for combining the received signals from each of the main array elements to provide a main array signal.

The system further includes an auxiliary array comprising first and second auxiliary antenna elements disposed respectively adjacent the outermost main antenna elements at a distance substantially equal to one-half the spacing d. Means are provided to combine the received signals from each of the auxiliary array elements to provide an auxiliary array signal. The system further comprises a means for summing the main array signal and the auxiliary array signal to provide a system signal. Because the respective main and auxiliary array patterns are well matched in phase and amplitude over a wide frequency range, the sidelobe energy in the main array signal is substantially cancelled by the auxiliary array signal.

The system can be implemented in an adaptive form by providing computer-controlled RF phase and amplitude weighting of the auxiliary array signal to adapt the weighting of the auxiliary array signal to particular disturbances.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

To achieve wideband wide angle sidelobe jammer cancellation in an antenna array, an auxiliary antenna is employed which matches the amplitude and the phase of the main antenna sidelobe structure over a wide frequency band and over a wide angle. The theoretical array factor of a uniformly illuminated n-element antenna array is nearly the same as that of a two-element auxiliary array with n times the regular element spacing, except for the $(1/\sin(x/2))$ amplitude element spacing by equations 1 and 2.

$$S_{MB}=e^{j(n-1)x/2}*\sin(nx/2)/\sin(x/2) \qquad (1)$$

$$S_{AUX}=e^{j(n-1)x/2}*\sin(nx/2) \qquad (2)$$

where the antenna array pattern=$(|S_{MB}|^2)*$(element pattern), the auxiliary pattern=$(|S_{AUX}|^2)*$(element pattern), $x=(2\pi f d \sin(\theta)/c)$, and $\theta$ is the azimuth angle.

Figure 1:
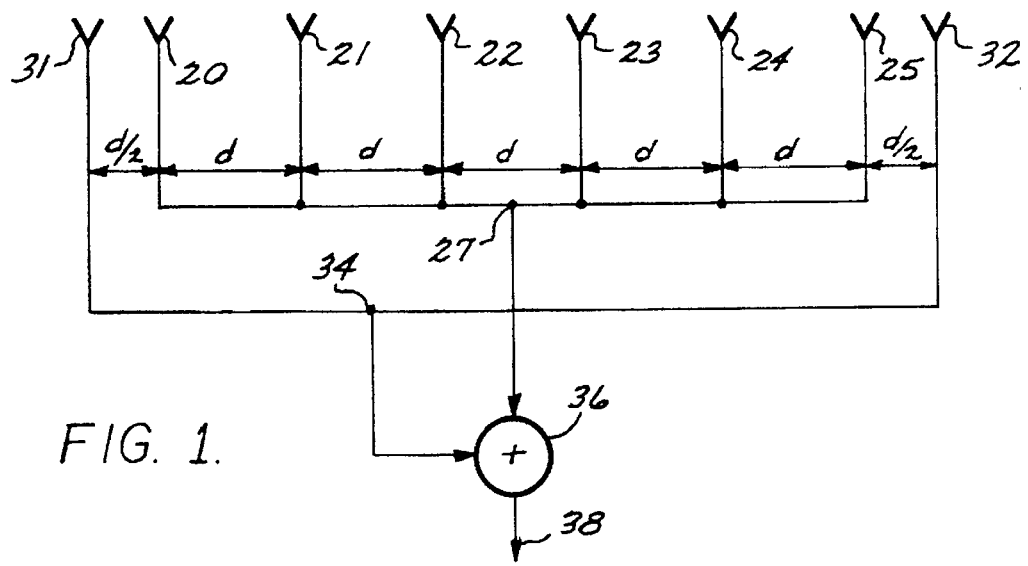
FIG. 1 is a schematic block diagram of a main array and a two-element auxiliary array system embodying the invention.

FIG. 1 illustrates in simplified schematic form an exemplary six-element main array and a two-element auxiliary antenna array. The main array comprises six radiating elements 20–25 whose outputs are summed at summing node 27, which may represent a corporate feed network as is well known to those skilled in the art. The auxiliary antenna array comprises radiating elements 31 and 32, whose respective outputs are summed at summing node 34 in antiphase to obtain the auxiliary array factor give by eq. 2. The respective signals from the main array and the auxiliary are summed by summing device 36 to provide the system output. In accordance with the invention, the main array elements 20–25 have a uniform spacing d, and the auxiliary elements 30 and 31 are respectively spaced d/2 from the end elements 20 and 25.

Figure 2:
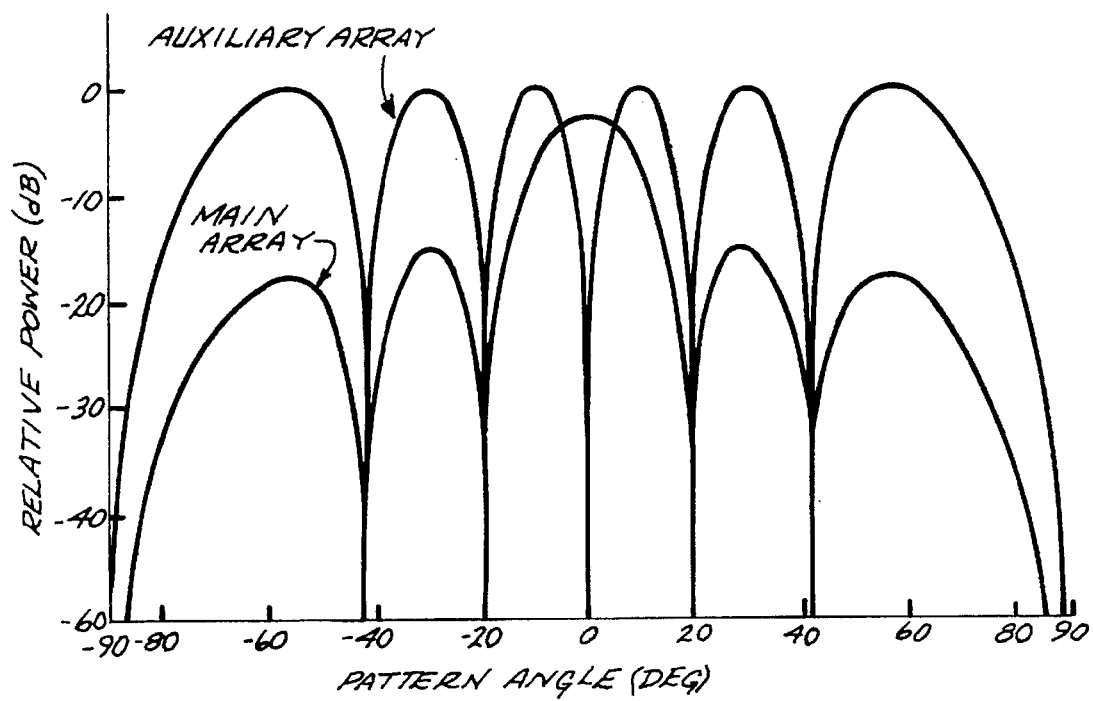
FIG. 2 illustrates the theoretical array patterns of the respective main array and auxiliary array of the system of FIG. 1.

The corresponding theoretical array patterns for the system of FIG. 1 are shown in FIG. 2. The power level of the auxiliary array pattern has been adjusted 7.8 dB higher to show the sidelobe structure. The main and the auxiliary antennas have good phase and amplitude matching due to the fact that, as frequency changes, the auxiliary array (interferometer) pattern expands or contracts in the same way as the sidelobe pattern of the main antenna array. Besides the proper matching in the sidelobe region, the auxiliary antenna also produces a null at the peak of the main beam, thus preventing degradation of the main beam. For an array system having electronic scanning capability, the auxiliary array can perform as well as the non-scanning case if the auxiliary array beam can scan with the main array beam. The array factors of the two antennas for the scanning case are identical to equations 1 and 2, except the expression of x. The new expression for x is $2\pi fd (\sin\theta - \sin\phi)/c$, where $\phi$ is the scan angle, and c is the speed of light.

Figure 3:
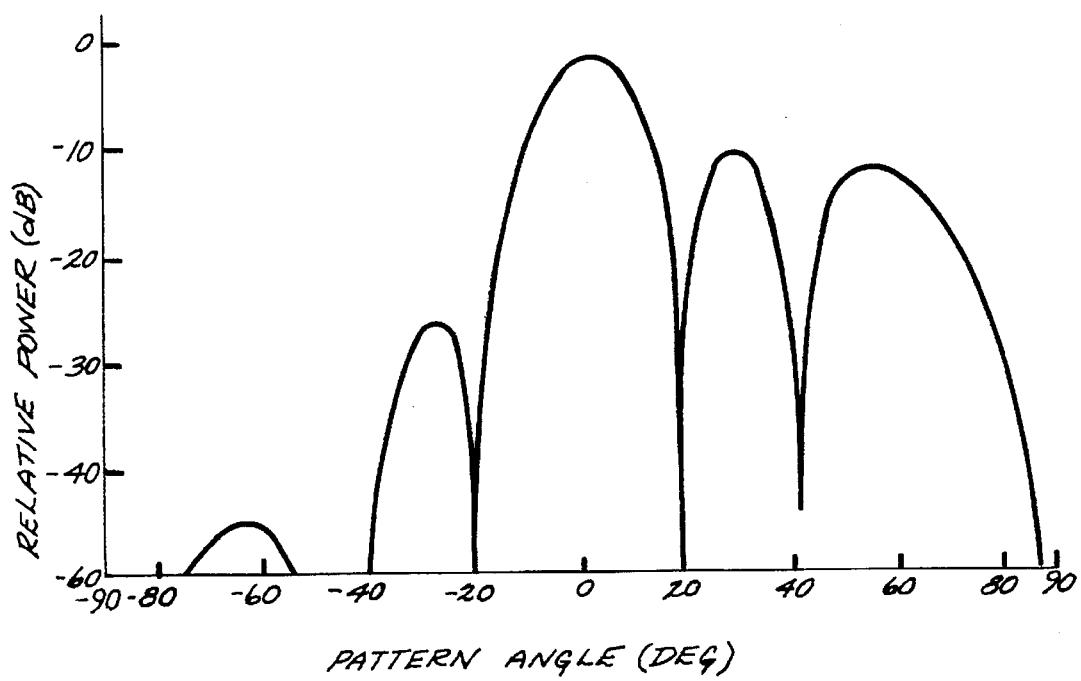
FIG. 3 illustrates a typical system array pattern after cancellation has occurred, showing a typical wide angle null at −50°.

Thus, the wideband wide angle jammer cancellation characteristic can be demonstrated without loss of generality by examining a six-element non-scanning case. FIG. 3 demonstrates a typical wide angle null at −50°. This null is achieved at the expense of increased sidelobe level on the opposite side of the main beam. In a typical application with the jammer near the horizon, the increased energy will be pointing near zenith and will not have a significant effect on performance. The angular width of the null was found to increase as the jammer moves away from the main beam due to the decrease in variation of the $1/\sin(x/2)$ amplitude mismatching factor. In the far-out sidelobe region, the argument (x/2) approaches 90 degrees for half-wavelength element spacing. Consequently, the $1/\sin(x/2)$ factor approaches one and a wider null width is achieved.

The wide null width shown in FIG. 3 implies wideband null formation. Equations 1 and 2 show the array factors are functions of x; x in turn is a function of the product of the frequency (f) and the sine of the azimuth angle. This implies that variation in frequency is equivalent to variation in angle. For example, a 14 degree angular null width as shown in FIG. 3 can be translated into 25% null bandwidth.

Figure 4:
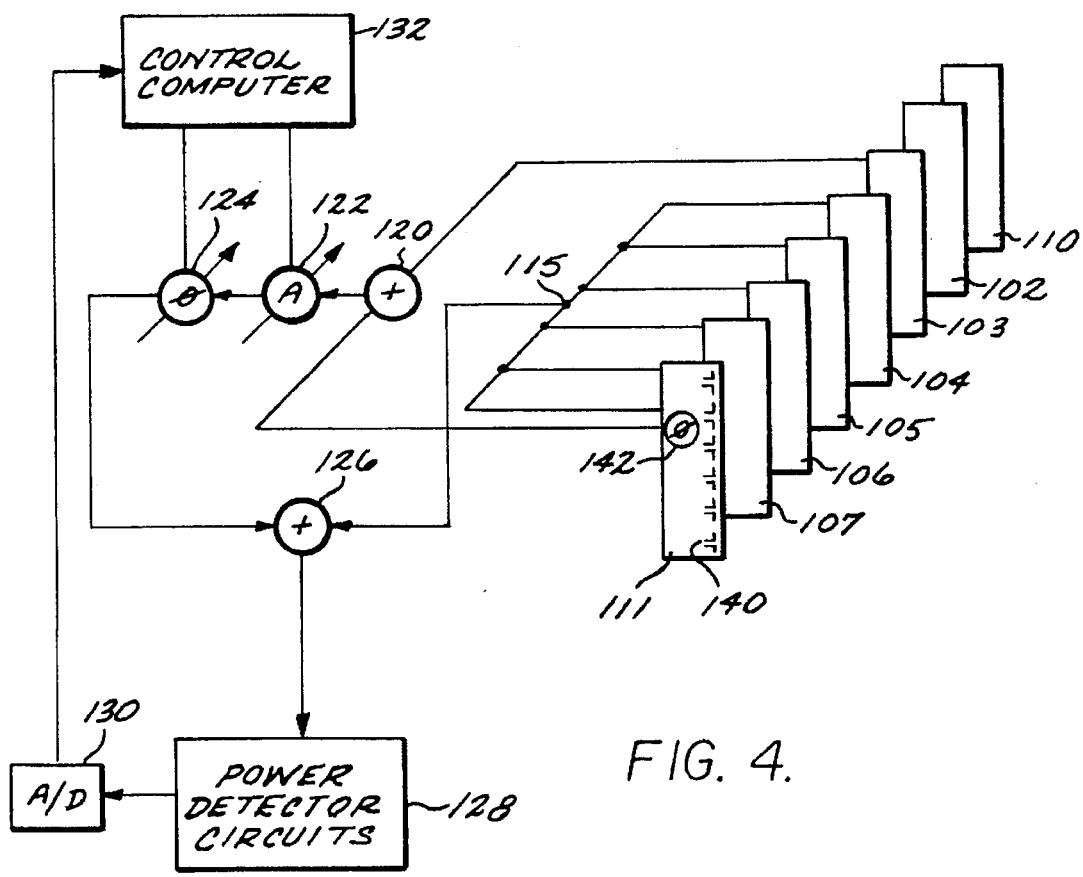
FIG. 4 is a schematic block diagram of an array system employing an adaptive canceller in accordance with the present invention.

A system 100 comprising a six-element uniformly illuminated main array and a two-element auxiliary array is shown in FIG. 4. The main array of the system 100 comprises six elements 102–107, and the auxiliary array comprises elements 110 and 111. The signal contributions received at the main elements are combined at combining node 115, and the combined main array signal is fed to summer 126. The signal contributions from the auxiliary elements are summed at summing device 120. The summed auxiliary array signal is fed to a digitally controlled adaptive sidelobe cancellation system comprising a digitally controlled RF attenuator 122 to amplitude weight the signal, and to a digitally controlled RF phase shifter 124 to phase weight the signal. The amplitude and phase weighted auxiliary array signal is then combined with the main array signal at summer 126, and the summer output signal is then fed to power detector circuit. The output of the power detector circuits 128 is converted to digital form and is input to the control computer 132. The control computer 132 controls the RF attenuator 122 and phase shifter 124.

Each element 102–107 and 110–111 is an S-band subarray module which consists of six dipoles 140 (shown on exemplary element 111), a phase shifter 142 and a power combiner for combining the contributions from each dipole. In accordance with the invention, the auxiliary array elements 110, 111 are positioned at half of the regular spacing from the end elements 102, 107 of the main array to line up the auxiliary array pattern nulls with sidelobe nulls.

The computer 132 is programmed to employ a "pattern search" algorithm to adaptively position nulls of the combined array pattern at jammer locations. Such search techniques are well known. See, e.g., "'Direct Search' Solution of Numerical and Statistical Problems," Robert Hooke, T. A. Jeeves, J. Assoc. Computer Machine, Volume 8, April 1961, pages 212–229.

The phase shifter 124 comprises S-band pin diode phase shifters; the attenuator 122 comprises pin diode attenuators. P/N diode RF weighting elements provide low insertion loss, good accuracy and low frequency disperson. Unlike commonly used IF weighting modules which severely limit the cancellation bandwidth due to frequency dispersion, the RF weighting elements have much smaller variation in both amplitude and phase response over the 300 MHz bandwidth than their IF counterparts.

The power detector circuits 128 comprises a limiter, a bandpass filter and a log-amp RF detector, and are used to measure the jammer power. The output of the power detector circuits 128 is sampled and converted into a digital signal via a 12-bit A/D converter 130. The jammer power measurements are sampled by the computer 132 to determine the optimum RF weight settings to cancel the jamming signal.

Figure 5:
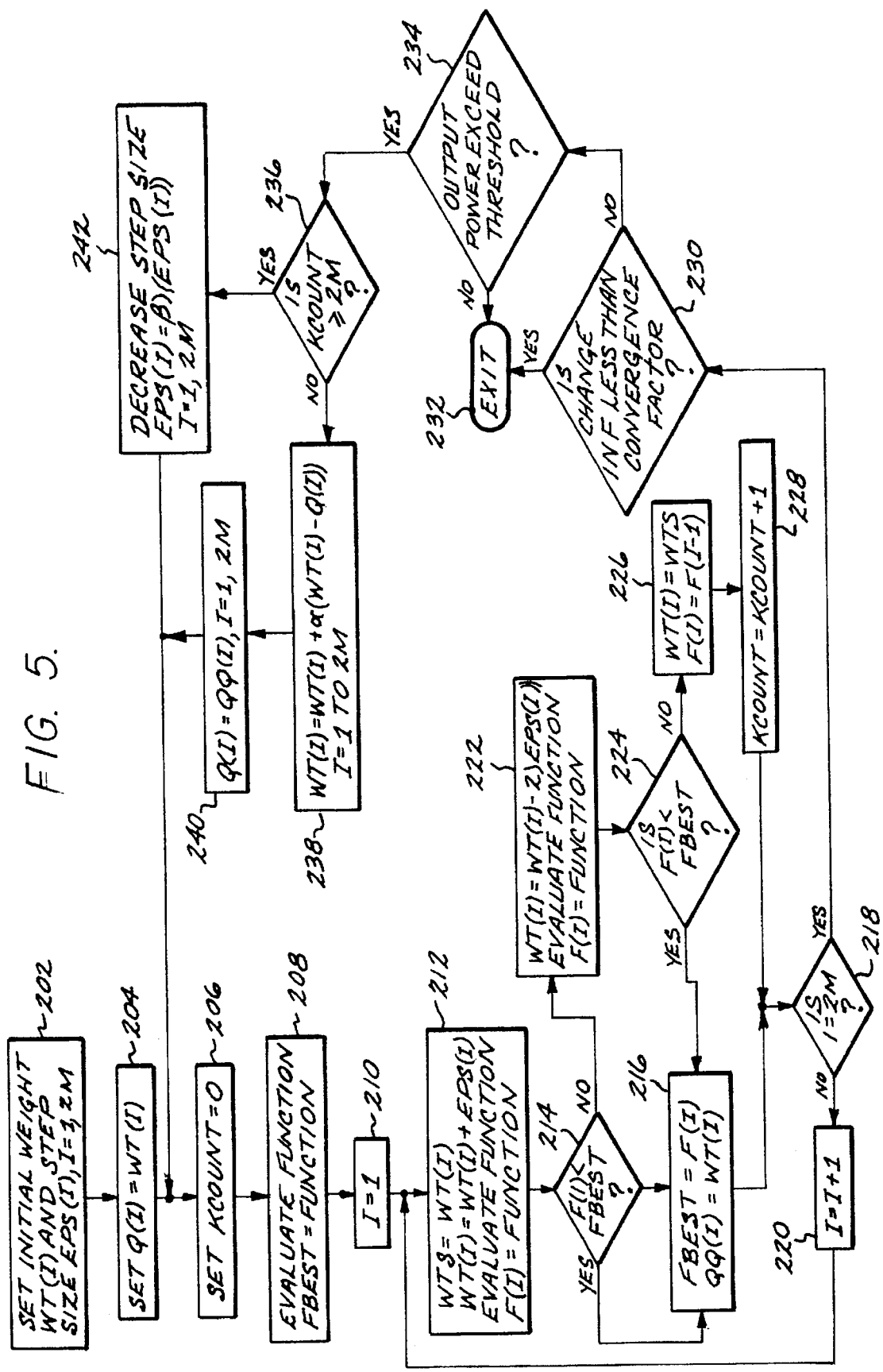
FIG. 5 is a flow chart illustrating a pattern search algorithm useful in the adaptive canceller system of FIG. 4.

FIG. 5 is a simplified flow diagram illustrating steps of an exemplary pattern search algorithm for adaptively changing the amplitude and phase weights in the system of FIG. 4 to minimize the detected jammer power at the power detector. At step 202 the initial weight value WT(I) and the initial step size EPS(I) are set for I=1 to 2M, where M=the number of independent controls in the system. For the system of FIG. 4, M=1, since there is only on canceller system, and 2M=2, i.e., the number of independent controls is two, the phase and amplitude weight controls. The weight is a complex variable, whose magnitude is the amplitude weight value shown as WT(1) and whose phase or angle value is the phase weight value shown as WT(2). At step 204 the parameter Q(I) is set equal to WT(I), to save this weight value. At step 206 the counter value KCOUNT is set to zero.

At step 208 the power function is evaluated, i.e., the power detector value is read, and the parameter FBEST is set equal to the detected value, with FBEST being used to save the current best power detected value, with "best" indicating the lowest detected power value. At step 210 the index value "I" is set to one.

At step 212 the parameter WTS is set equal to WT(I), and the value WT(I) is set equal to WT(I) plus EPS(I). The power detector function is evaluated, and the parameters F(I) is set equal to the detected power level or function value. At step 214 the present value of F(I) is compared to the present value for FBEST. If F(I) is less than FBEST this indicates that the change in the weight values improved the detected power function, and therefore at step 216, the parameter FBEST is set equal to the present value of F(I), and the parameters QQ(I) is set equal to the present value of WT(I) to save the present values.

At step 218 the value of I is checked, and if I does not equal 2M, then the value of I is incremented by one, and operation loops back to step 212. If I equals 2M at step 218, operation proceeds to step 230.

At step 214, if the value for F(I) is not less than FBEST, this indicates that the change in the weight value did not improve the detected power function. At step 222 WT(I) is set equal to the present value of WT(I) minus twice the value of EPS(I), the detected power function is evaluated under the condition of the new weight value, and the value of F(I) is set equal to the detected power level. At step 224, the present value for F(I) is compared to FBEST, and if less than FBEST, indicating improvement in the detected power function is achieved, operation proceeds to step 216. If F(I) is not less than FBEST, then at step 226, the value of WT(I) is set to WTS, the value of P(I) is reset to the initial value F(I−1), and at step 228, the parameter KCOUNT is incremented, and operation proceeds to step 218.

At this point two tests are performed to determine whether the power function improvement is such that it is appropriate to exit the adaptive algorithm. At step 230, if the change in the detected power function F between iterations is less than a predetermined convergence factor, then the algorithm is exited (step 232). If the change is greater than the convergence factor, then at step 234, the detected power level is compared to a predetermined noise threshold level, and if the detected power does not exceed this threshold, the algorithm is exited. If the power level exceeds the threshold, then at step 236 the value of KCOUNT is compared to 2M, and if smaller, operation proceeds to step 238. Here, the weight WT(I) is set equal to the present value of WT(I) plus the product of an acceleration factor $\alpha$ and the difference between WT(I) and Q(I). The value of Q(I) is updated to QQ(I) and operation returns to step 206. If the value of KCOUNT at step 236 is greater than 2M, then all independent controls have now been varied. The step size is decreased at step 242 by a deceleration factor $\beta$, and operation returns to step 206. The algorithm is repeated until the exit point is reached, either because the change in the detected power level is less than the convergence factor or the output power does not exceed the noise threshold level.

In one exemplary laboratory test setup for testing the system of FIG. 4, a transmitting horn antenna was positioned at 35 degrees off the broadside of the receiving aperture. A swept frequency RF signal generator was connected to the transmitting horn to simulate a wideband jammer. The jamming power received by the main antenna over a 300 MHz bandwidth was initially displayed on a spectrum analyzer and recorded. The "pattern search" algorithm was then executed against the jammer. After a few iterations, a wideband wide angle null was positioned at the jammer location. After the nulling has been completed, the residual jammer power was displayed on the spectrum analyze and recorded. The algorithm produced a 30 dB null at the center frequency. The weight settings were then held for null bandwidth examination. A 20 dB null was achieved over the entire 300 MHz bandwidth.

The system of FIG. 4 was also tested in an anechoic chamber. The after cancellation pattern for the jammer at 42 degrees was recorded. The null angular width measured was 2 degrees for the jammer at 35 degrees and 3 degrees for the jammer at 42 degrees. The null angular width is limited by the feed errors and the active element pattern difference between the main beam and the auxiliary beam. The active element pattern of the interferometer is broader than that of the main beam due to the required half-spacing to form a pattern described by equation 2. Null angular width may be improved by reshaping the active element pattern and by reducing the feed errors. It was also found that the energy in right hand sidelobe region has been pushed to left hand sidelobe region.

A wideband, wide angle, canceller system has been disclosed. The selection of the interferometer as an auxiliary antenna broadens the null bandwidth and the null angular width. The wideband null formation can provide adequate ECCM capability in the sidelobe region for imaging radar systems. This system can also provide anti-jam capability for time domain multiple access (TDMA), frequency hopping, and pseudo random noise coded communication systems.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. An antenna array system having a wideband sidelobe canceller, comprising:

a main antenna array comprising a plurality of main antenna elements regularly spaced and separated by a distance d in a substantially linear configuration arranged along a first axis characterized by two outermost elements;

means for combining the received signal from each of the main array elements to provide a main array signal;

an auxiliary array comprising first and second auxiliary antenna elements disposed respectively adjacent the outermost main antenna elements at a distance substantially equal to d/2;

means for combining the received signals from each of the auxiliary array elements to provide an auxiliary array signal so that the theoretical array factor of the auxiliary array is given by the relationship $$S_{AUX} = e^{j(n-1)x/2} * \sin(nx/2),$$

where $x = (2\pi fd \sin(\Theta)/c)$, f is the frequency, c is the speed of light and $\Theta$ is the azimuth angle; and means for summing the main array signal and said auxiliary array signal to provide a system signal wherein the sidelobe energy comprising said system signal is substantially reduced over the sidelobe energy comprising said main array signal.

2. The array system of claim 1 wherein said means for amplitude and phase weighting said auxiliary array signal comprises a variable RF attenuator and a variable RF phase shifter.

3. The array system of claim 2 wherein said means for amplitude and phase weighting said auxiliary array system further comprises a means for detecting the power level of said system signal and providing a power level signal; means for digitizing said power level signal; and a digital computer responsive to said digitized power level signal for controlling the values of said variable attenuator and said phase shifter to minimize the detected power level.

4. The array system of claim 1 wherein each said main array element and auxiliary array element comprises a plurality of antenna sub-elements disposed along a second axis which is substantially orthogonal to said first axis, means for combining the signals received at said sub-elements and means for phase shifting said combined sub-element signals to steer the main array beam and auxiliary array beam in desired directions.

5. In an array system having a main array comprising a plurality of main antenna elements regularly spaced and separated by an element spacing distance d in substantially linear configuration along a first axis and characterized by two outermost main antenna elements, and means for combining the received signals from each of the main array elements to provide a main array signal, ana adaptive sidelobe canceller system comprising:

an auxiliary array comprising first and second auxiliary antenna elements disposed respectively adjacent said outermost main antenna elements at a distance substantially equal to one-half the main element spacing d;

means for combining the received signals from each of the auxiliary array elements to provide an auxiliary array signal to obtain the theoretical array factor of the auxiliary array given by the relationship $$S_{AUX} = e^{j(n-1)x/2} * \sin(nx/2).$$

where $x = (2\pi fd \sin(\Theta)/c)$, f is the frequency, c is the speed of light and $\Theta$ is the azimuth angle;

means for variably phase and amplitude weighting the auxiliary array system in response to amplitude and phase weighting control signals;

means for combining said main array signal and said weighted auxiliary array signal to provide a system signal;

means for detecting the power level of said system signal and providing an detector signal indicative of the detected power level; and controller means responsive to said detector signal for generating said amplitude and phase weighting signals to minimize the detected jammer power level of said system signal.

6. The sidelobe canceller system of claim 5 wherein said controller means comprises a digital computer having programming means for iteratively executing a pattern search algorithm to vary the amplitude and phase weighting control signals to minimize said detected power level.

7. The sidelobe canceller system of claim 5 wherein said means for phase and amplitude weighting said auxiliary array signal comprises a digitally controlled variable RF phase shifter and a digitally controlled variable RF attenuator.

8. An antenna array system having a wideband sidelobe canceller, comprising:

a main antenna array comprising a plurality of main antenna elements regularly spaced and separated by a distance d in a substantially linear configuration arranged along a first axis characterized by two outermost elements;

means for combining the received signal from each of the main array elements to provide a main array signal;

an auxiliary array comprising first and second auxiliary antenna elements disposed respectively adjacent the outermost main antenna elements at a distance substantially equal to d/2;

means for combining the received signals from each of the auxiliary array elements to provide an auxiliary array signal to obtain the theoretical array factor of the auxiliary array given by the relationship $$S_{AUX} = e^{j(n-1)x/2} * \sin(nx/2),$$

where $x = (2\pi fd \sin(\Theta)/c)$, f is the frequency, c is the speed of light and $\Theta$ is the azimuth angle;

means for summing the main array signal and said auxiliary array signal to provide a system signal wherein the sidelobe energy comprising said system signal is substantially reduced over the sidelobe energy comprising said main array signal; and means for amplitude and phase weighting said auxiliary array signal to achieve improved sidelobe cancellation.

\* \* \* \* \*